Nov. 13, 1956  F. HERZEGH  2,770,282
TUBELESS PNEUMATIC TIRE
Filed Feb. 10, 1954
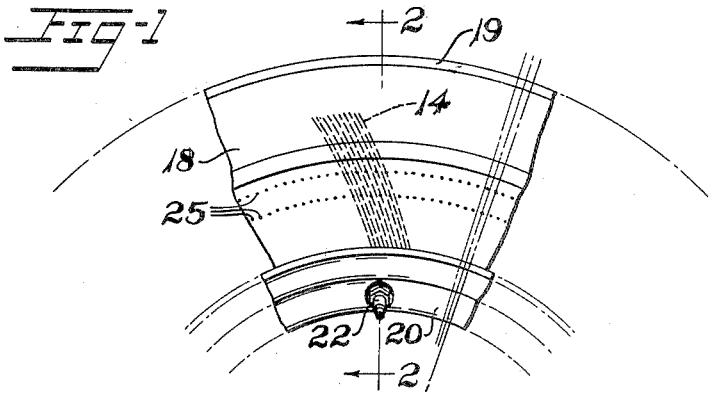
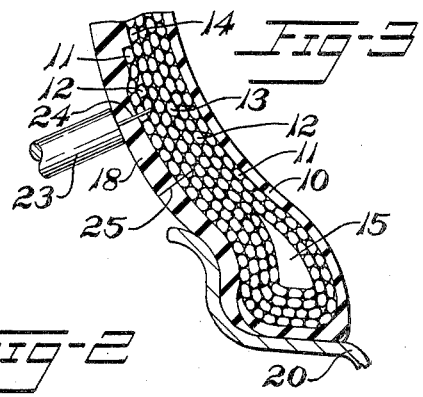
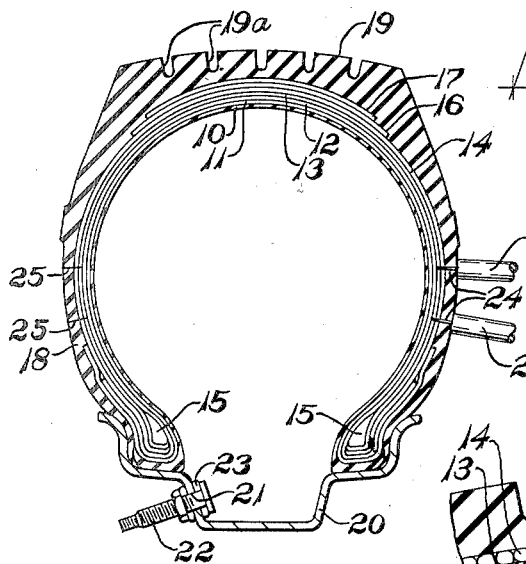
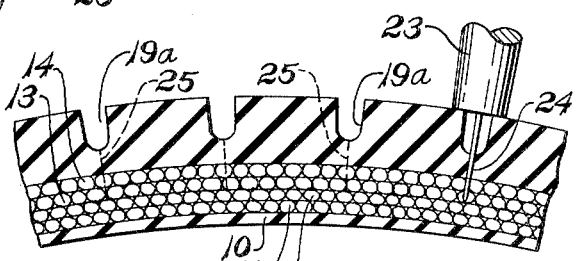
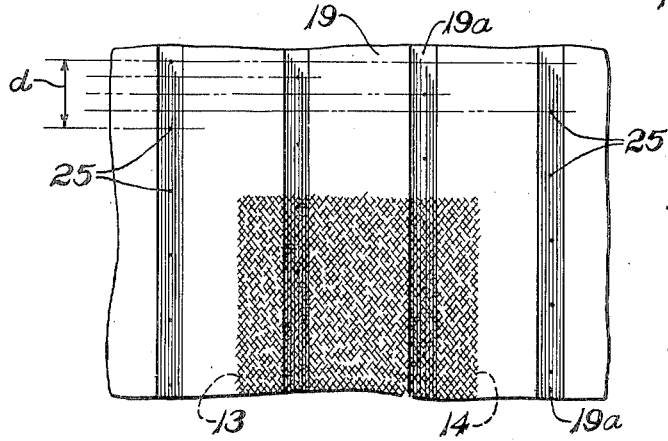
INVENTOR.
FRANK HERZEGH
BY C. E. Tripp
ATTY.

United States Patent Office 2,770,282
Patented Nov. 13, 1956

2,770,282

TUBELESS PNEUMATIC TIRE

Frank Herzegh, Cleveland, Ohio, assignor to The B. F. Goodrich Company, New York, N. Y., a corporation of New York Application February 10, 1954, Serial No. 409,291

2 Claims. (Cl. 152—330)

This invention relates to pneumatic tires, and in particular to open-bellied hollow annular tires which are mounted directly on wheel rims without use of inner tubes.

It has often been suggested that pneumatic tire casings be mounted directly on wheel rims without inner tubes, and especially on drop center rims which are made seamless, so that there is no opening for escape of air through the rim other than the valve hole, in which an air valve can be fastened with the interposition of a rubber washer. The tire casings usually have enough resilient rubber on the outer or heel face of the bead to seal fairly satisfactorily against the rim flange and prevent escape of inflation air at that point. However, experience shows that in the course of time most pneumatic tire casings mounted in that manner will fail because of ply separation resulting from the inflation air bleeding or diffusing through the textile carcass of the tire, and exerting its pressure directly against the outer plies and most particularly between the outer ply and the tread and sidewall so as to blow outer parts loose from the remainder of the tire. Even application of a rubber lining of approximately the thickness of an inner tube to the inner surface of the tire casing does not prevent such failure due to separation, since the inflation air diffuses through a rubber lining and into the plies more rapidly than it can escape from the plies through the heavy tread. Pressure will build up within the tire casing and this, coupled with the dynamic stresses engendered during running, will lead ultimately to destruction of the tire. Due to modern high speed operation, this condition is particularly troublesome at the tread, where the forces of centrifugal force and air pressure are directly additive.

The ultimate object of this invention is accordingly to eliminate the cause of separations when pneumatic tires are mounted without inner tubes. More specifically, an object is to provide a simple means of permitting escape of internal pressure from the carcass of tubeless pneumatic tires and to do so in a manner that will not result in damage to the tire due to rot from moisture entering the plies or due to mechanical failure resulting from the venting means. A still further object is to provide an inexpensive and serviceable tubeless tire.

The tire of this invention is illustrated in the accompanying drawing, in which Fig. 1 is a fragmentary side view of a tire made in accordance with this invention, mounted on a drop center rim, and Fig. 2 is a cross-section on an enlarged scale, taken on line 2—2 of Fig. 1, showing the mounted tire and how it may be prepared.

Fig. 3 is a fragmentary section showing a modified form,

Fig. 4 is a fragmentary tread section taken transversely of the tread showing another form of the invention, and Fig. 5 is a plan view of a tread portion of the form of Fig. 4.

In accordance with this invention tires are prepared for mounting on standard drop center rims without use of inner tubes, by construction of the tire in the conventional manner, except that a thin layer of rubber or similar material is incorporated in the tire structure on the inside of the inner ply to act as a barrier against the escape of inflation air directly into the carcass plies and that after the tire is built and after vulcanization is completed, the outer layer of rubber is perforated with an awl, needle, or similar instrument into the plies and without removal of rubber so as to provide channels for the escape of air which would otherwise build up pressure within the tire carcass.

In the tire illustrated in Figs. 1 and 2, the tire consists of an inner layer 10 of a suitable soft rubber composition to prevent escape of the inflation air on the inner surface of the inner reinforcing ply of the tire. Outside of the rubber layer 10 and adhered thereto are the reinforcing plies which may consist of successive plies of crossed cords 11, 12, 13 and 14, each consisting of a layer of air-conducting stranded or fibrous cords of suitable textile material, such as cotton, rayon, nylon, or even fine twisted wire embedded in a rubber composition, the cords extending diagonally from one bead across the sidewall and crown of the tire to the other bead, the angle of each ply being opposite to those of the plies on either side of it. The edges of the plies 11, 12, 13 and 14 are anchored to a pair of inextensible grommets 15, 15 of wire or other suitable material, by being turned around or under the grommets in the conventional way, the arrangement being such that the reinforcing plies extend radially outward from each grommet and merge with the plies extending from the other grommet. Outside of the external ply 14 may be one or two layers 16, 17 of similar cord material or coarse textile material, known as overheads or breakers for shielding the carcass against impact and bruises, although in passenger car tires these are often omitted. The lateral portions of the tire are protected by a layer of tough wear-resistant rubber material of moderate thickness known as sidewall rubber 18, and the crown portion of the tire is covered by a much heavier layer of tread rubber 19, which may be formed with any desired antiskid pattern, such as circumferential grooves 19a. The tire as described above is conventional in every respect, except for the addition of the air-containing liner 10, and is built, shaped and vulcanized in a mold in the usual manner.

After vulcanization is complete, the tire may be mounted on a conventional doubly-flanged drop-center rim 20, and in the valve hole 21 of the rim is mounted the valve stem 22, with a rubber washer 23 under its head to seal the valve stem against escape of air. The mounted tire can then be firmly inflated and subjected to the following treatment.

The sidewall rubber 18 and preferably also the core reinforcing plies of the tire are punctured at intervals throughout the circumferential extent of the tire, by a sharp pointed instrument such as an awl or needle 23, preferably provided with a shoulder 24 spaced along the shank of the awl a distance equivalent to the thickness of the sidewall rubber, plus about half or slightly more the thickness of the textile reinforcement of the carcass. No rubber is removed in the process and the size of the needle is not critical because once the point pierces the rubber the material around the pierce simply stretches. The shoulder 24 acts as a gauge to avoid penetration of the awl point 23 beyond the textile reinforcing plies, since the awl, if it were to puncture the lining 10, would make it impossible for the tire to hold air. As to depth of penetration, I have found that with a four-ply carcass, for example, it is sufficient to pierce the rubber through two plies, in other words, with the manner of venting of this invention, if the outer two plies are vented air will not be trapped between the tread and the outer wall of the carcass, and as to the two inner plies, the bond is between the inner plies usually strong enough to withstand forces of the air diffused into those plies because such air can find its way to the vented plies.

After withdrawal of the awl, the opening 25 which it has made is closed by the resiliency of the rubber, as is illustrated on the left sidewall of Fig. 2, and is practically invisible. Such openings may be made with a single instrument by hand, or can be made mechanically in a single operation by pressing a gang tool against the tire, but are preferably made by repeated application of a group of awls around the circumference of the tire or by mounting the points of the awls around the circumference of a rotary tool which is rolled around the circumference of the tire. In any case, the puncture openings are preferably made in a plurality of lateral locations in the sidewalls, and in a considerable number around the circumference of each of the two sidewalls of the tire. As to the preferred physical arrangement of the punctures 25, I prefer that they be spaced circumferentially of the tire by a distance equal to the center-to-center circumferential spacing of the cords. This insures that virtually every cord will be vented, which is the optimum condition. To avoid initiating a circumferential crack at the punctures, the latter are arranged in two or more spaced rows, as indicated in Fig. 1. In addition to spacing the rows, the punctures are circumferentially staggered so that they do not fall into a radial line. This minimizes any tendency of the punctures to cause radial cracking. In the case of two rows, the circumferential spacing of the punctures in one row will be twice the cord spacing. Three or more rows may be employed, with a corresponding increase in row spacing.

In the form shown in Fig. 3, the inner plies 11 and 12 are turned up on the outside of the outer plies 13 and 14. Here, if the punctures 25 are made into the turnups the inner plies will be vented before air can diffuse into the outer plies 13 and 14. This action is described in detail in my co-pending application, Serial No. 405,586 filed January 22, 1954 wherein a different venting means is disclosed.

In the form of Figs. 4 and 5, the outer plies 13 and 14 are vented at the tread, where blistering is most serious, particularly with high speed operation over hot pavements. In this case the needle 24a must be longer than before, but the shank 23 acts as a depth gauge as before. The punctures 25 are spaced as widely as possible in each groove consistent with the objective of pricking to each cord. This can be accomplished by spacing the punctures 25 in each groove by a distance "$d$" that equals the product of the circumferential spacing of the cord centers and the number of grooves that contain punctures. Since the crown angle of the cords in plies 13 and 14 is such that they cross at the tread at about 38° to the midplane there need be no particular relation between the location of the punctures from groove to groove, because the grooves are much wider than the cord spacing, it thereby being improbable that the same cord will be punctured twice.

It is not essential that the tires be mounted and inflated before treatment, although it is convenient to treat the tires in this condition. The sidewalls or tread of the tires of this invention can be provided with the puncture openings 25 at any time after completion of the vulcanization, whether or not the tire is mounted and inflated. However, it is essential that the tire be vulcanized first since otherwise the punctures would disappear during the cure.

When properly made, the puncture openings permit escape of internal pressure from the vented cords or their neighbors, since the cords of the reinforcing plies function as channels through which the air from any crown portion of the tire can travel to the neighborhood of one of the puncture openings 25 from which it can escape. This has been explained in more detail in my aforesaid co-pending application. Nevertheless, the openings are so small that moisture and other deteriorating influences cannot enter.

Tires made in accordance with this invention are inexpensive, since the small quantity of rubber material needed to provide the lining 10 is less than that required for a standard inner tube for a standard tire casing. They will be free from the tendency of ply separation, which has long prevented general adoption and use of tubeless tires, and will provide cool-running, safe and economical tire equipment for motor vehicles.

Having completed a detailed description that will enable those skilled in the art to practice my invention, I claim:

1. A tubeless pneumatic tire consisting of a pair of inextensible bead grommets, a plurality of reinforcing plies of closely spaced, crossed, air-conducting cords anchored to the grommets and extending radially outward from each grommet and merging with the cord plies extending outward from the other grommet to form an open-bellied hollow carcass, the innermost ply of cords having turnups extending around the bead portions and along the outside of the carcass to a zone of the bead portions destined to be radially outwardly of the rim flanges, an air-containing lining of flexible material bonded to the innermost surface of the reinforcing plies, a vulcanized rubber road-engaging tread on the crown of the reinforcing plies, flexible vulcanized rubber sidewall covers on that portion of the reinforcing plies not covered by the tread, and punctures formed in the sidewall covers without removal of rubber material, said punctures extending through the sidewall cover to vent said turnups, said punctures being held in a normally closed position by the resiliency of the sidewall cover material but opening up under sidewall flexure, said punctures as a group being spaced circumferentially about said sidewall by a distance substantially equal to the center-to-center spacing of said cords, successive punctures in the group being radially staggered.

2. The article of claim 1 in which said punctures are formed in the sidewall covers after vulcanization of the tire.

References Cited in the file of this patent
UNITED STATES PATENTS

| 2,031,560 | Day | Feb. 18, 1936 |
| 2,504,090 | Sanderson | Apr. 11, 1950 |
| 2,587,470 | Herzegh | Feb. 26, 1952 |